United States Patent [19]

Bierdeman

[11] Patent Number: 4,932,391
[45] Date of Patent: Jun. 12, 1990

[54] GRILL DEVICE

[76] Inventor: Carl F. Bierdeman, P.O. Box 207, Upland, Ind. 46989

[21] Appl. No.: 341,735

[22] Filed: Apr. 20, 1989

[51] Int. Cl.$^5$ ............................................. F24B 3/00
[52] U.S. Cl. .................... 126/30; 126/25 A; 126/25 AA; 126/9 R; 99/421 HH; 99/449; 248/125
[58] Field of Search ........... 126/29, 30, 25 A, 25 AA, 126/9 R; 99/419, 421 H, 421 HH, 449; 248/121, 122, 125, 156

[56] References Cited

U.S. PATENT DOCUMENTS

| | | | |
|---|---|---|---|
| 2,887,944 | 5/1959 | Walker | 99/421 HH |
| 2,940,439 | 6/1960 | Bartels et al. | 126/30 |
| 3,095,869 | 7/1963 | Swenson | 126/29 |

FOREIGN PATENT DOCUMENTS 210839  6/1984  Fed. Rep. of Germany ........ 99/419

OTHER PUBLICATIONS

Roto-Broil Corp. of America, New Improved Interchangeable Spit, 10/1956, 1-page advertisement.

Primary Examiner—James C. Yeung
Assistant Examiner—Alan Cariaso
Attorney, Agent, or Firm—Robert A. Spray

[57] ABSTRACT

A grill device or grill kit, having a base, support post, and a cantilevered support arm, adjustably interconnected for wide accommodation of cooking or grilling situations, outdoors or even indoors in a front-loading stove or fireplace. The support arm, and its revolvable connection to the support post, provide for use of the support arm as a rotisserie, and both a motor and a hand crank are provided for the grill-turning function; and diversity is further accommodated by the grill body itself being adjustable for flat-support use, or for meat-clamping use when the grill and support arm are used as a rotisserie.

18 Claims, 2 Drawing Sheets

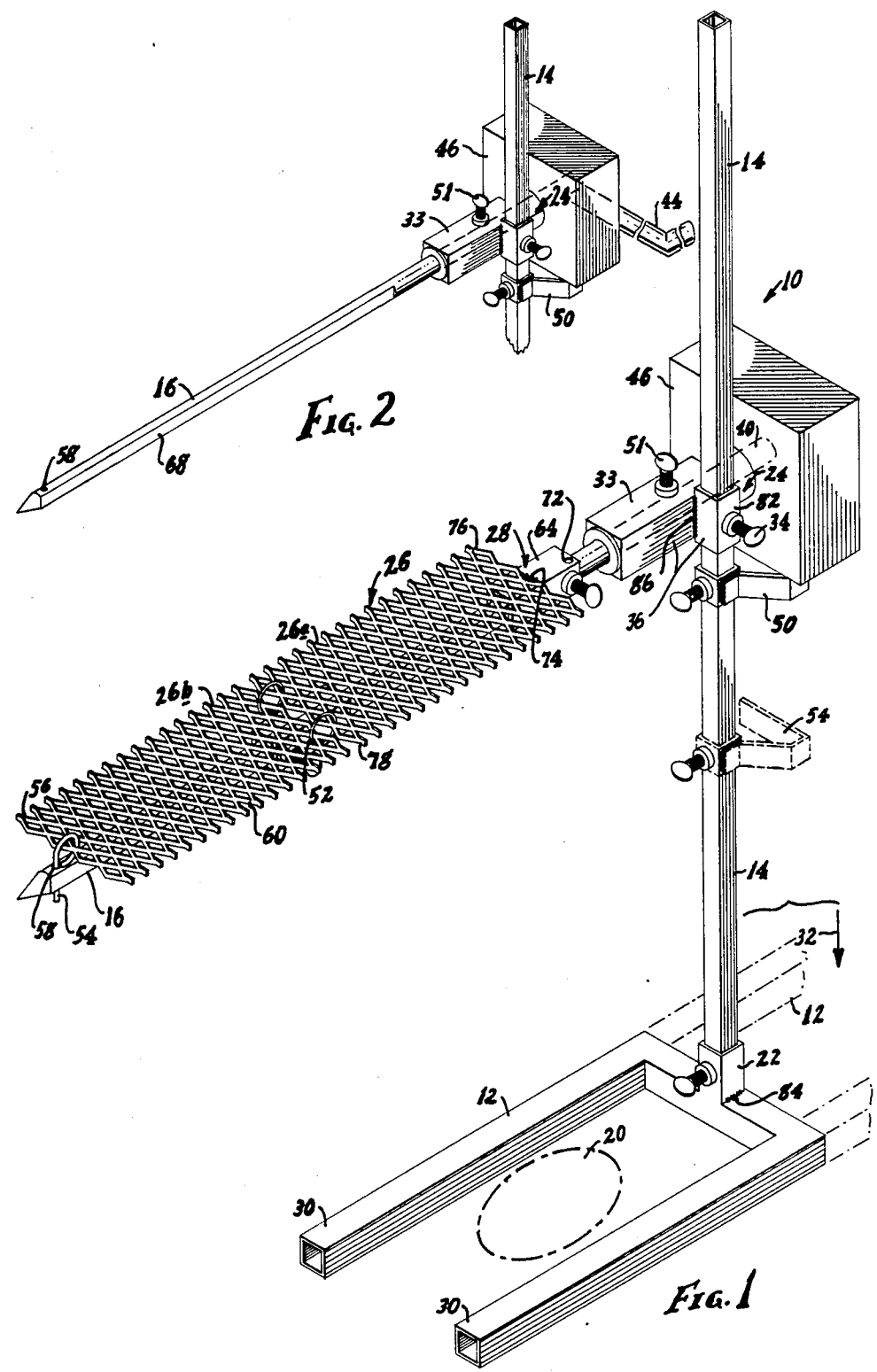

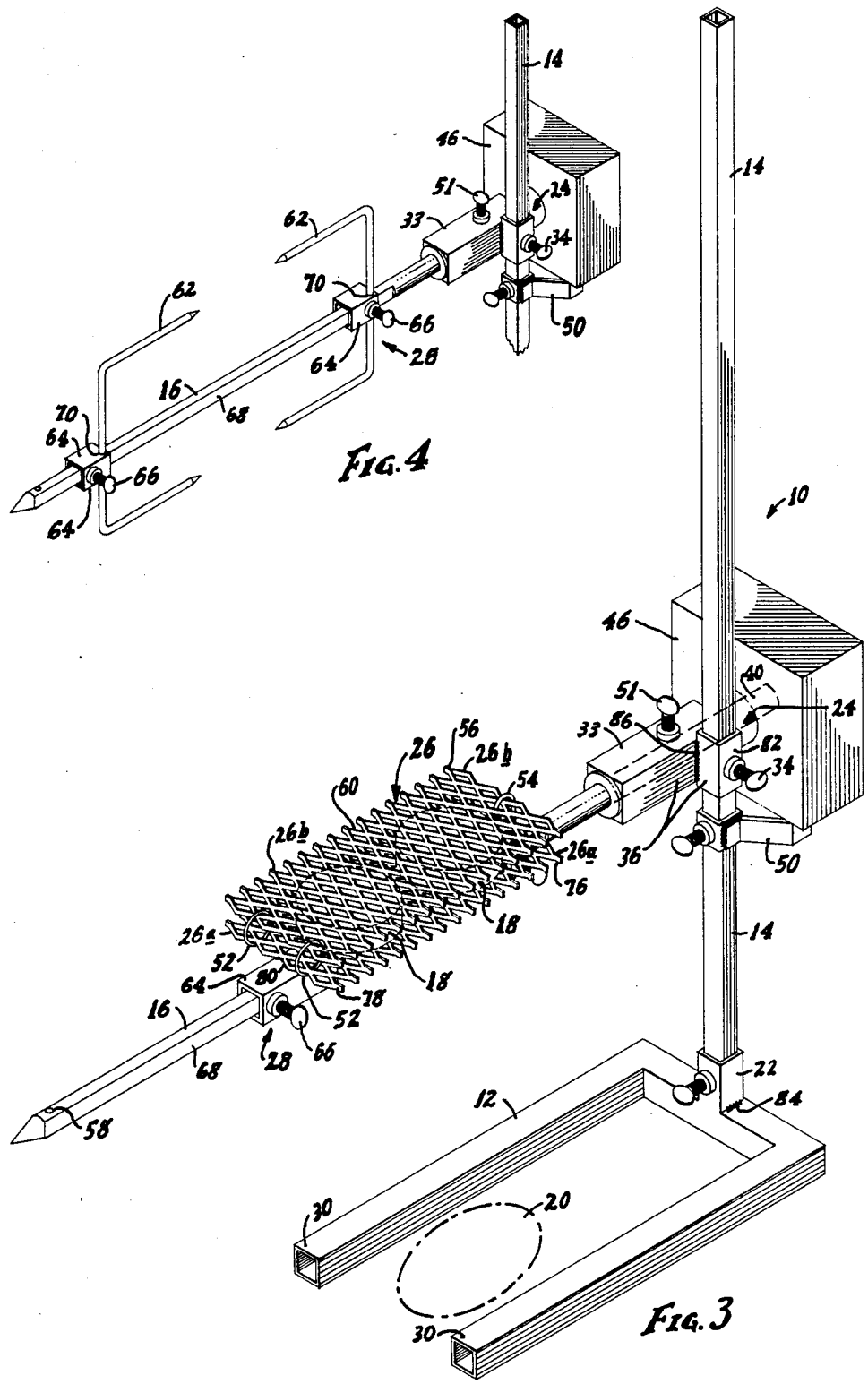

GRILL DEVICE

FIELD OF THE INVENTION

The present invention relates to cooking devices or apparatus, and more particularly to an apparatus for the cooking or grilling of meat.

Cooking grills of various types are of course well known; and thus the present invention is just to concepts of certain details of the overall apparatus and to its combination of features and details as will be apparent as described herein.

SUMMARY OF THE INVENTION

According to the present invention, a horizontal grill-support arm is connected to a vertical support post, which is itself connected to a base, all the connections being adjustable, and the connection between the support arm and support post is further movable in that it accommodates the horizontal arm to revolve; and to effect the revolving, there is provided both a hand crank and a motor giving a rotisserie operativity of either powered or non-powered nature.

The horizontal arm is provided with a movable grill, which itself is formed of movable sections, providing that the grill may be used in an opened or flat-out condition for maximum area, or a folded over condition for clamping meat when using the device as a rotisserie.

These and other features, and their advantages and details, will be more apparent as the description proceeds.

The prior art does not show the inventive concepts, even though the cooking mechanism art is quite ancient, including grills for outdoor use The prior art of cooking and cooking by grills is no doubt one of the most ancient as to use and development; and the prior art for equipment in this realm has long provided various modifications; and, since it has been long known that cooking procedures, specifically including the grilling of meat, encounter a variety of heating situations, with outdoor cooking particularly being non-uniform, the prior art has provided not only a variety of cooking and grill features and arrangements but also has utilized a variety of concepts of adjustability and optionality of use.

And since cooking and grilling procedures are quite basic to human life, and since the acts of cooking and grilling meat are such easily-observed procedures, and since most all persons have personally participated in cooking and grilling, the prior art non-origination of particularly the present combination of concepts and features is realistically to be recognized as more non-obvious than improvements would likely be in most other fields of endeavor.

With this background, the significance of the combination of concepts of the present invention, by which the user is provided with an effective, economical, and practical grill device, having considerable optionality of use for accommodation of diverse cooking situations, is better to be evaluated as to relative advantages and non-obviousness of the inventive concepts.

In a hindsight consideration of the present invention's concepts to determine its inventive and novel nature of the invention as a whole, it is not only conceded but emphasized that the prior art had multiple details of support, adjustability, etc., which would have been usable in this invention, but only if the prior art had had the guidance of the present concepts of the present invention; and the prior art for centuries had much motivation as to grilling apparatus of the present invention.

That is, it is emphasized that the prior art had several particulars of prior art and motivation which individually and accumulatively show the non-obviousness of this combination invention as to its various features:

Supports; slidable supports; adjustments; hinges of various kinds; upright stands; bearings providing both support and rotatability; etc. Such mechanisms, of various types, are devices which are of ancient use and knowledge, even adjustable supports in cooking and grill apparatus; and such and similar devices including specifically those for cooking apparatus, have been used by all or an untold numbers of persons, the world over.

Further non-obviousness of the invention as a whole is shown by the fact that support mechanisms having considerable adjustability have been provided in specifically meat-grilling equipment.

With the reality of all these factors, the inventive non-obviousness of the present invention is quite manifest.

The prior art has had features of the present invention, and approaches to its concepts, but not in the combination by which the invention as a whole is advantageously achieved The background of prior art as just summarized seems more significant in showing the nonobviousness of the present concepts when also it is reminded that the prior art also had long provided long and used principles of support and adjustability for accommodation of many types of devices, and the prior art long realized that adjustability was quite desirable in devices for cooking and grilling; and metal-shaping and metal-forming and other manufacturing procedures are well known by which all components of the present invention could have been made, if the prior art had had the specific concepts of the invention.

And the existence of such articles embodying such various features is not only conceded, it is emphasized; for as to the novelty here of the combination, of the invention as considered as a whole, a contrast to the prior art helps show both the great variety of the various prior art attempts of improvement, and the advantages and the inventive significance of the present concepts. Thus, as shown herein as a contrast to all the prior art, the inventive significance of the present concepts as a combination is emphasized, and the nature of the concepts and their results can perhaps be easier understood.

Although varieties of prior art are conceded, and ample motivation is shown, and full capability in the prior art is conceded, no prior art shows or suggests details of the overall combinations of the present invention, as is the proper and accepted way of considering the inventiveness nature of the concepts.

That is, although the prior art shows an approach to the overall invention, of adjustable cooking devices, and the prior art has shown various natures of supports and adjustability, it is significant that none of the prior art shows the novel and advantageous combination, which provides the merits of this invention, even though certain details are shown separately from this accomplishment.

Accordingly, the various concepts and components are conceded and emphasized to have been widely known in the prior art as to various devices; nevertheless, the prior art not having had the particular combination of concepts and details as here presented and shown in novel combination different from the prior art and its suggestions, even only a fair amount of realistic humility, to avoid consideration of this invention improperly by hindsight, requires the concepts and achievements here to be realistically viewed as novel combinations, inventive in nature. And especially is this a realistic consideration when viewed from the position of a person of ordinary skill in this art at the time of this invention, and without trying to reconstruct this invention from the prior art without use of hindsight toward particulars not suggested by the prior art of all relevant fields.

BRIEF DESCRIPTION OF THE DRAWINGS

The above description of the novel and advantageous invention is of somewhat introductory and generalized form. More particular details, concepts, and features are set forth in the following and more detailed description of an illustrative embodiment, reference being had to the accompanying generally diagrammatic and schematic drawings, in which:

FIGS. 1 and 3 are pictorial views of a grill device according to the present invention, illustrating relatively high adjusted portion of the grill in FIG. 1 in comparison to FIG. 3, and illustrating in FIG. 1 an extended or in-line position of the two grill bodies; and in chain lines a support bracket is shown as pushed downwardly to an out-of-the-way position, and in chain lines the base is also shown as being held oppositely to that shown in full lines. FIG. 2 is a fragmental detail of a top portion of FIG. 1 illustrating a support bar connected to the second connections means of the device;

FIG. 3 is a pictorial view similar to FIG. 1 with a lower height-adjustment for the grill body and its support arm, and with the two grill bodies juxtaposed into meat-clamping position; and FIG. 4 is a pictorial view of the top portion of FIG. 3, but illustrating the use of meat skewers instead of the grill bodies of FIGS. 1 and 3, the meat skewers being adjustably located along the horizontal support bar.

DESCRIPTION OF ILLUSTRATIVE EMBODIMENT:

As shown in the drawings, the overall combination is a grill device or apparatus 10, providing a multiplicity of adjustment features.

Its general features as most apparant are a supporting base 12, a support post 14, and a support arm 16. Their function and co-operative utility of supporting a piece of meat 18 above a heating fire 20 will be apparent from the drawings, as will their adjustability and other special features.

An adjustable connection, here called a first connection means 22, supportingly connects the support post 14 to the base 12; and the significance of the adjustability of that connection 22 will be apparent below.

A second adjustable connection, here called a second connection means 24, supportingly connects the support arm 16 to the support post 14; and ts adjustability and nature will also be shown below.

A grill body 26, on the support arm 16, is held by a third adjustable feature, here designated as a third connection means 28, which supportingly connects the grill body 26 to the support arm 16; and of course the direct support of the meat or other cook-item 18 is the grill body 26.

The description now turns to features of adjustability.

The first connection means 22 is to be noted as substantially spaced from a stability-portion 30 of the base 12 which is generally under the support arm 16, such that the support post 14 is stably supported, i.e., supported to be held operatively upright even though the weight and distance from the second connection means 24, of all of the support arm 16, the grill body 26, and the meat or other cook object 18 being carried by the grill 26, are such as to create a moment-arm effect which might or would topple the support post 14 from its upright position.

This feature of operatively upright support is achieved by the counter-balancing supportive effect of the above-mentioned spaced or stability-portion 30 of the base 12 engaging the ground with enough moment-arm effect of its own to offset the moment-arm effect of the support arm 16, grill body 26, and cook object 18.

As to the benefit of adjustability of the first connection means 22 as to the base 12 and support post 14, those two components (base 12 and post 14) may be supportingly connected in optional orientations; this provides that even though one orientation may be optionally such as to provide that the spaced portion 30 of the base 12 provides the counter-balancing moment-arm supportive effect mentioned above, the orientation also may be optionally a second orientation (chain lines) such that the stability-providing or spaced portion 30 may be given its counter-balancing moment-arm supportive effective by a log or other external wreight, or the like as an associated force means 32 with the stability-providing or spaced portion 30 of the base 12 removed from the position of the associated heating means 20 generally under the support arm 16, thus achieving device-stability but without the base-portion 30 being in or made dirty or ash-covered by the fire 20.

As to the second connection means 24, one of its features is that it provides optionality of height, i.e., the user's option as to how high above the base 12 it is that the support arm 16 is supported, thus how high the grill body 26 and meat 18 are spaced from the fire 20. Thus, it is shown with a bolt 34 threaded into a hole in the casing 36 of the second connection means 24, engageable firmly onto the post 14.

Not height-adjustment is a feature of the second connection means 24, however; for in its role of providing support of the support arm 16 by the support post 14 it permits the support arm 16 to be revolved while being supported by the second connection means 24. Thus the second connection means 24 and its overall casing 36 provides a horizontal bearing 33 for rotatable support of the support arm 16.

The support arm 16 is further noted as provided with an extension 40, it being located oppositely from the grill body 26, i.e., when the support arm 16 is supportively connected to the support post 14, by the second connection means 24, the support arm extension 40 is on the side of the second connection means 24 which is opposite to that to which the grill body 26 is connected to the support arm 16 by the third connection means 28.

As to provisions for rotisserie effect, there is provided a crank handle 44 and a motor 46, each with means connectable to the said support arm extension 40 for optional use in causing the rotisserie or revolving effect of the support arm 16 and grill 26.

There is provided for the motor 46 not only means connecting the motor 46 to the support arm extension 40 for causing a revolving effect of the support arm 16 and grill body 26, but motor-support means here shown as a brace 50 connectable to the motor 46 and support post 14, respectively, for supporting the motor 46 while it causes the revolving effect to the support arm 16 and grill 26 with the meat 18 clamped thereon.

When rotisserie effect is not desired, the revolvable support arm 16 is held against inadvertent revolving by blocking means, i.e., a means which is regulatable to provide the option of the support arm 16's revolvability or blockage against revolving, that blocking means being here shown as a bolt 51 which is threaded into a hole of the casing 36's part 33, and firmly engageable onto the horizontal support arm 16.

Adjustability and optionality is also provided for the grill body 26. As shown, grill body 26 is provided to be formed of at least two relatively movable body members 26a and 26b, with hinge means 52 movably interconnecting the two body members 26a and 26b of grill unit 26. The hinge 52 is shown as a pair of rings loosely interconnecting the grill bodies 26a and 26b.

This relative movability of the grill 26's two body members 26a and 26b permits an end-to-end arrangement thereof on the support arm 16 (FIG. 1) for relatively maximal support-area for cook objects 18, but also provides them to be able to be put in a relatively juxtaposed arrangement (FIG. 3) for supporting both sides of a cook object 18 when the support arm 16 and the grill body 26 are being revolved as in rotisserie effect.

Further, adjustability and optionaly is provided for the overall grill body feature 26. That is, the third connection means 28 is connected to a first one (26a) of the grill's body members, and the second one (26b) of the grill's body members is provided with a pin 54 adjacent the end 56 of the second grill body member 26b which is remote from the hinge means 52, and the support arm 16 is provided with a hole 58. Further, the second one (26b) of the grill body members is supported when in its end-to-end arrangement of the grill 26 by the presence of the pin 54 in the hole 58 and by the hinge means 52 connection of the two grillk body members 26a and 26b, and by the third connection means 28's connection to the first grill body member 26a and the support arm 16.

It will be further noted that the grill body member 26b, that being the grill-body which is the one non-adjacent the horizontal support arm 16 when the two grill body members 26a/26b are in their relatively juxtaposed arrangement, i formed of expand metal 60 of a diamond nature, and more particularly being more flexible in one direction than the other, and the grill body member 26b is provided from such material by a piece thereof in which the direction of more flexibility is perpendicular to the hinge means 52, thus accommodating a relatively easy bending thereof along lines parallel to the hinge means 52 to accommodate without undue mashing meat or other cook objects 18 when held between that that grill member 26b and the other grill member 26a, while that grill member 26b is resiliently deformed over the cook objects 18 in being firmly connected to the other grill member 26a in their clamped, juxtaposed arrangement.

Both grill bodies 26a and 26b are shown of expanded metal.

The skewers 62 are each slidably held onto the support arm 16 by holding bodies 64 which are parts of the third connection means 28, and held by thumbscrews 66; and adjustability along the support arm 16 is provided by an elongated flat 68 extending along substantially its full length, the flat 68 being a cutaway feature accommodating the thickness of the skewer rods 62 in offset holes 70 in the wall of the holding bodies 64 without need of extra looseness or extra size of those holding bodies 64, which are shown as economically formed from standard symmetric cross-section stock here shown as being square cross-section, just large enough to freely be assembled onto the support arm 16.

The cutaway nature of the flat 68 also accommodates the thickness of the holding pin 54 at the end 56 of grill body 26b when that pin 54 is used to clamp the grill bodies 26a and 26b in their juxtaposed condition (FIG. 3) by being inserted (FIG. 3) in an offset hole 72 (hidden in FIG. 3 but shown in FIG. 1).

That hole 72 is in the holding body 64 which is connected as by weld 74 to the end 76 of the grill body 26a which is the grill body end 76 which is remote from the end 78 of the grill body 26a which is shown connected as by weld 80 to a holding body 64 (as shown in FIG. 3) in the region of the hinge 52.

The holding bodies 64 of the third connection means 28 may be of various lengths, as indicated in the drawings. Thus, e.g., the holding bodies 64 of FIG. 4, which hold the skewers 62, are shown as relatively shorter than the holding bodies 64 of FIGS. 1 and 3 which illustrate connection means 28 which connect the grill 26 (26a and 26b) to the horizontal support arm 16, by welds 74 and 80 of the grill body 26a.

The first connection means 22 and the portion 82 of the second connection means 24 (which is the body-portion 36 which is the portion assembled vertically onto the vertical support rod 14) are also shown as formed of material from square cross-section stock. The body 22 is shown as welded at 84 to the base 12; and the body 82 is shown as welded at 86 to the support body 33. All of the connection means are shown as having screw-type clamping means, providing tight yet releasable connections as shown.

Preferably, the various parts or components of the overall invention are provided in kit form; and with the first connection means 22, the second connection means 24, and the third connection means 28 all being of releasable nature, this provides not only the advantage of marketing of the overall device 10 in knocked-down or kit form but accommodates convenient disassembly for ease of cleaning and storage.

SUMMARY OF OPERATIVITY:

The various features of adjustability and optionality of positioning of the parts, as already described as to particulars, give many options:

a. Relative orientation of base 12 and post 14; and of base 12, and arm 16 and grill body 26;

b. Relative heights of arm 16 and grill 26, as to post 14 and base 12;

c. Revolvability or fixed nature of arm 16 as to the post 14;

d. Crank or motor for rotisserie effect;

e. Use outdoors and with various indoor heating provisions;

f. Various relative positions of grill-bodies for maximal object carry, or for clamped-portion positioning for rotisserie use.

g. All easy to assemble from kit form, and easily to quite fully dis-assemble as for cleanup and storage.

CONCLUSION:

It is thus seen that a grill device, especially in kit form, as provided and used according to the inventive concepts herein set forth, provides novel concepts of a desirable and advantageous device, yielding the advantages of an overall grill assembly having advantageous details and features, which, in overall combination, is and are conceptually different from the prior art grills even though various objects embodying certain of the mechanical details as a basic capability have of course been known for years; yet significantly this particular conbination, even considered as including or building on prior art concepts, has not been suggested by the prior art, this achievement being a substantial and advantageous departure from prior art, all this even though the prior art shown attempts at improvement and variations as to grill devices and other cooking devices for many years, including cooking grill units for outdoor use. Ane particularly is the overall difference from the prior art significant when the non-obviousness is viewed by a consideration of the subject matter as a whole, as integrally incorporating a combination of features as different from the prior art, in contrast to merely those details of novelty themselves, and further in view of the prior art teaching away from the particular and inter-related concepts and features of the present invention.

In summary as to the nature of these advantageous concepts, their inventiveness is shown by novel features of concept and construction shown here, in novel and advantagous combvination, not only being different from all the prior art known, but because the achievement is not what is or has been suggested to those of ordinary skill in the art, especially realistically considering this as comprising components which individually are similar in nature to what is well known to makers and users of grills and other cooking devices for many years. No prior art has suggested the modifications of any prior art to achieve the novel concepts here achieved, with the various features providing their own functions in the overall combination; and this is particularly significant since cooking devices are probably in the oldest field of art ever known, and because cooking grills are objects whose mechanisms are easy and apparent to observe, and have been no doubt observed by most all persons the world over, for all ages.

Accordingly, it will thus be seen from the foregoing description of the invention according to this illustrative embodiment, considered with the accompanying drawings, that the present invention provides new and useful concepts of a novel and advantageous grill device or apparatus, having and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown.

What is claimed:

1. A grill device, comprising:
   a supporting base;
   a support post;
   first connection means, supportingly connecting the support post to the base;
   a support arm;
   second connection means, supportingly connecting the support arm to the support post;
   a grill body;
   and third connection means, supportingly connecting the grill body to the support arm;
   in which the first connection means is substantially spaced from a portion of the base which is generally under the support arm, such that the support post is supported to be held operatively upright even through the weight and distance from the second connection means, of the support arm, the grill body, and cook object carried by the grill, are such as to create a moment-arm effect which would topple the support post from its upright position;
   said operatively upright support being achieved by the counter-balancing supportive effect of said spaced portion of the base engaging the ground with enough moment-arm effect of its own to offset the moment-arm effect of the support arm, grill body, and cook object;
   in a combination in which the first connection means is such that the base and support post may be supportingly connected in optional orientations, thereby providing that even though the orientation may be optionally such as to provide that said spaced portion of the base provides said counter-balancing moment-arm supportive effect, the orientation also may be optionally such as to provide that said spaced portion may be given its counter-balancing moment-arm supportive effect by an associated force means, with said spaced portion of the base removed from the position of associated heating means generally under the support arm.

2. The invention as set forth in claim 1 in a combination in which the second connection means is such as to provide optionality as to how high above the base the support arm is supported.

3. The invention as set forth in claim 1 in a combination in which the second connection means provides not only support of the support arm by the support post but permits the support arm to be revolved while supported by the second connection means.

4. The invention as set forth in claim 3 in combination in which the support arm is provided with an extension which, when the support arm is supportively connected to the support post by the second connection means, is on the side of the second connection means opposite to that to which the grill body is connected to the support arm by the third connection means.

5. The invention as set forth in claim 4 in a combination in which there is provided a crank handle and a motor, each with means connectable to said support arm extension, for optional use in causing revolving effect of the support arm and grill body.

6. The invention as set forth in claim 4 in a combination in which there is provided a motor, and means connecting the motor to the said support arm extension, for causing a revolving effect of the support arm and grill body, and motor-support means with means connectable thereto and to the motor and support post respectively for supporting the motor while it causes said revolving effect to the support arm and grill.

7. A grill device, comprising:
   a supporting base;
   a support post;

first connection means, supportingly connecting the support post to the base;
a support arm;
second connection means, supportingly connecting the support arm to the support post;
a grill body;
and third connection means, supportingly connecting the grill body to the support arm;
in which the second connection means provides not only support of the support arm by the support post but permits the support arm to be revolved while supported by the second connection means;
in a combination in which the grill body is provided to be formed of at least two relatively movable body members, with hinge means movably interconnecting the said two body members,
the movability of the two body members permitting an end-to-end arrangement thereof on the support arm for relatively maximal support area for cook objects, but also providing the two body members to be in a relatively juxtaposed arrangement for supporting both sides of a cook object when the support arm and grill body are revolved.

8. The invention as set forth in claim 7 in a combination in which the third connection means is connected to a first one of the body members, and the second one of the body members is provided with a pin adjacent the end thereof remote from the hinge means, and the support arm is provided with a hole; and the second one of the grill body members is supported when in said end-to-end arrangement by the presence of the pin in the hole and by the hinge means connection of the two body members, and by the third connection means connection to the first grill body member and the support arm.

9. The invention as set forth in claim 7 in a combination in which the grill body member, which is the one non-adjacent the support arm when the two grill body members are in their relatively juxtaposed arrangement, is formed of expanded metal of a diamond nature and more flexible in one direction than the other, and the said grill body member is provided from said material by a piece thereof in which the direction of more flexibility is perpendicular to the hinge means, thus accommodating a relatively easy bending thereof along lines parallel to the hinge means to accommodate without undue mashing cook objects when held between said grill member and the other grill member while said grill member is resiliently deformed over the cook objects in being firmly connected to the other grill member in their juxtaposed arrangement.

10. The invention as set forth in claim 7, in a combination in which the grill body member, which is the one non-adjacent the support arm when the two grill body members are in their relatively juxtaposed arrangement, is formed to be more flexible in one direction than the other, which in the direction of more flexibility is perpendicular to the hinge means, thus accommodating a relatively easy bending thereof along lines parallel to the hinge means to accommodate without undue mashing cook objects when held between said grill member and the other grill member while said grill member is resiliently deformed over the cook objects in being firmly connected to the other grill member in their juxtaposed arrangement.

11. The invention as set forth in claim 1 in a combination in which the parts specified therein are provided in kit form, with the first connection means, the second connection means, and the third connection means all being of releasable nature, providing not only the advantage of marketing of the device in knocked-down or kit form but accommodating convenient disassembly for ease of cleaning and storage.

12. The invention as set forth in claim 3 in which the second connection means is provided with a regulatable rotation blocking means whose regulation provides that it will block the support arm against being revolved, and will permit the support arm to be revolved, at the option of the user.

13. The invention as set forth in claim 7 in a combination in which the third connection means connects a first one of the grill body members to the support arm, and the second one of the grill body member is supported by the first one of the grill body members for at least part of the second grill body member's connection to the support arm.

14. The invention as set forth in claim 13 in a combination in which the third connection means includes a clamping means, and there is provided a holding pin, for holding the second of the grill body members,
and the hinge means provides that the second one of the grill body members may be placed, when the two grill body members are in said juxtaposed arrangement, such that the holding pin will be operatively connected to the support arm as an incident to the clamping of the third connection means to the support arm.

15. The invention as set forth in claim 14 in a combination in which the third connection means is provided with a hole through which may be inserted the said holding pin, thus providing the said clamping of the holding pin as an incident of clamping the third connection means to the support arm.

16. The invention as set forth in claim 8 in a combination in which the third connection means includes a clamping means, and there is provided a holding pin, for holding the second of the grill body members,
and the hinge means provides that the second one of the grill body members may be placed, when the two grill body members are in said juxtaposed arrangement, such that the holding pin will be operatively connected to the support arm as an incident to the clamping of the third connection means to the support arm, said holding pin being the same pin whose presence in the hole in the support arm supports the second one of the grill body members when in end-to-end arrangement.

17. The invention as set forth in claim 16 in a combination in which the third connection means is provided with a hole through which may be inserted said holding pin, thus providing said clamping of the holding pin as an incident of clamping the third connection means to the support arm.

18. The invention as set forth in claim 1 in a combination in which the device is provided as a kit which also includes skewer means, and connection means for supportingly connecting the skewer means to the support arm,
and the said connection means for skewer means, and the third connection means, are of releasable nature, providing optionality to the user as to whether the support of the associated cook-object is to be by grill means or by skewer means.

* * * * *

UNITED STATES PATENT AND TRADEMARK OFFICE
CERTIFICATE OF CORRECTION

PATENT NO. : 4,932,391

DATED : June 12, 1990

INVENTOR(S) : Carl F. Bierdeman

It is certified that error appears in the above-identified patent and that said Letters Patent is hereby corrected as shown below:

Col. 3, line 19: Show a space between the words "DESCRIPTION" and "OF".
Col. 3, line 35: Mark to show a new paragraph is begun by the reference "Fig. 2".

Col. 4, line 48: After "Not" insert: -- only --.
Col. 5, line 44: Correct the spelling of "grill".
Col. 5, line 51: Correct the spelling of "is".
Col. 5, line 51: Correct the spelling of "expanded".

Col. 7, line 20: Correct the spelling of "And".
Col. 7, line 32: Correct the spelling of "combination".
Col. 10, line 16, which is Claim 13, line 4: Correct the spelling of "members".
Col. 10, line 62, which is Claim 18, line 6: Before "said" delete "the" and before "skewer" insert: -- the --.

Signed and Sealed this

Fifth Day of May, 1992

Attest:

DOUGLAS B. COMER

*Attesting Officer*     *Acting Commissioner of Patents and Trademarks*